US012683153B2

(12) United States Patent
Chen et al.

(10) Patent No.: US 12,683,153 B2
(45) Date of Patent: Jul. 14, 2026

(54) METHOD OF FABRICATING NANOPOROUS Zn ANODES AND THE APPLICATIONS IN Zn BATTERIES

(71) Applicant: The Hong Kong University of Science and Technology, Hong Kong (CN)

(72) Inventors: Qing Chen, Hong Kong (CN); Liangyu Li, Hong Kong (CN); Yung Chak Anson Tsang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 805 days.

(21) Appl. No.: 17/933,657

(22) Filed: Sep. 20, 2022

(65) Prior Publication Data

US 2023/0163287 A1 May 25, 2023

Related U.S. Application Data

(60) Provisional application No. 63/283,193, filed on Nov. 24, 2021.

(30) Foreign Application Priority Data

Dec. 10, 2021 (CN) .......................... 202111506478.8

(51) Int. Cl.
  *H01M 4/42* (2006.01)
  *H01M 10/26* (2006.01)
(52) U.S. Cl.
  CPC ............. *H01M 4/42* (2013.01); *H01M 10/26* (2013.01); *H01M 2300/0014* (2013.01)
(58) Field of Classification Search
  CPC .......... H01M 4/42; H01M 4/38; H01M 10/26; H01M 10/28; H01M 2300/0014
  See application file for complete search history.

(56) References Cited

U.S. PATENT DOCUMENTS

| | | | |
|---|---|---|---|
| 3,753,779 A | 8/1973 | Franko et al. | |
| 2003/0099882 A1 | 5/2003 | Hampden-Smith et al. | |

(Continued)

FOREIGN PATENT DOCUMENTS

| | | |
|---|---|---|
| CN | 111048771 A | 4/2020 |
| WO | 2016/178187 A1 | 11/2016 |

OTHER PUBLICATIONS

Wang, C., et al., "Monolithic Nanoporous Zn Anode for Rechargeable Alkaline Batteries," ACS Nano, 2020, pp. A-H.

(Continued)

*Primary Examiner* — Raymond Alejandro
(74) *Attorney, Agent, or Firm* — SALIWANCHIK, LLOYD & EISENSCHENK

(57) ABSTRACT

A method of making a free-standing nanoporous Zn is provided. The method includes compacting a predetermined amount of Zn compound precursor into a form of an anode; controlling a thickness of the Zn compound precursor to obtain desirable porosity; and reducing the Zn compound precursor in an electrochemical cell having an electrolyte at a predetermined volage against a reference electrode to obtain a nanoporous Zn anode. The nanoporous Zn includes continuous metal ligaments and pores each having a uniform width of around a few hundred nanometers. The nanoporous Zn may serve as an anode in a rechargeable Zn battery having the nanoporous Zn anode coupled to a conductive substrate, a physical block, an electrolyte, a reference electrode, and a cathode electrode, to deliver a high areal capacity and a long cycle life.

10 Claims, 4 Drawing Sheets

(56)     References Cited

U.S. PATENT DOCUMENTS

| | | |
|---|---|---|
| 2004/0166412 A1 | 8/2004 | Bugnet et al. |
| 2011/0052896 A1 | 3/2011 | Jayaraman |
| 2018/0083276 A1* | 3/2018 | Khasin .................. H01M 4/244 |

OTHER PUBLICATIONS

Li, L., et al., "Phase-transition tailored nanoporous zinc metal electrodes for rechargeable alkaline zinc-nickel oxide hydroxide and zinc-air batteries," Nature Communications, 2022, 13(2870): 1-9.

* cited by examiner

METHOD OF FABRICATING NANOPOROUS Zn ANODES AND THE APPLICATIONS IN Zn BATTERIES

CROSS-REFERENCE TO RELATED APPLICATIONS

This application claims the benefit of U.S. Provisional Application No. 63/283,193, filed Nov. 24, 2021, and claims the benefit under 35 U.S.C. § 119 of Chinese Application No. 202111506478.8, filed Dec. 10, 2021, the disclosures of each of which are incorporated herein by reference in their entirety.

BACKGROUND OF THE INVENTION

In recent year, Zinc (Zn) has attracted much attention for its unfulfilled potential in rechargeable batteries. As one of the most abundant metals on the earth, Zn offers a theoretical volumetric capacity of 3694 Ah/L. The sluggish hydrogen evolution on the Zn surface allows it to work in an aqueous, particularly alkaline electrolyte, eliminating any fire hazard as well as reducing the manufacturing costs. Zinc can be a drop-in replacement of the expensive metal hydrides to leverage on the mature manufacturing technology of alkaline Ni cells. Further, Zinc anode can be paired with an air cathode to afford a practical energy density as high as 400 Wh/kg. However, neither type of battery has reached a long cycle life under practical requirements such as a high areal capacity, a high depth of discharge, and a low volume electrolyte. Most cells fail within 150 cycles, which is uncompetitive against the ever-improving lithium-ion batteries.

The failures root in the undesirable paths of the phase transitions between Zn and ZnO during battery reactions. In an alkaline electrolyte, common Zn anodes are made from a bed of mostly ZnO powder, which is then partly reduced to Zn metal in the very first charging step. The reduction can invoke long-range transports of zincate ions in the electrolyte to form massive zinc granules that grow cycle by cycle at the cost of the uniformity in electrode structure and other properties such as the electric conductivity. The dense granules as the reaction hotspots may be covered by thin layers of ZnO that passivate them against complete discharging, whereas Zn mass from the rest of the electrode is drawn to these hotspots, leaving behind depleted areas which are visible even to the naked eyes. This phenomenon of shape changes has plagued the rechargeability of Zn anodes for decades. A potential solution to the problem needs to simultaneously achieve two goals, namely, an even distribution of the Zn formation and a sustainable transition between Zn and ZnO.

US20170338479A1 disclosed an electrochemical cell comprising an anode current collector; an anode in electrical contact with the anode current collector; an electrolyte; a cathode current collector; a cathode comprising silver or silver oxide in electrical contact with the anode current collector; and a separator between the anode and the cathode. The anode is made by a method comprising: providing a mixture comprising a metallic zinc powder and a liquid phase emulsion; drying the mixture to form a sponge; annealing and/or sintering the sponge in an inert atmosphere or under vacuum at a temperature below the melting point of zinc to form an annealed and/or sintered sponge having a metallic zinc surface; and heating the annealed and/or sintered sponge in an oxidizing atmosphere at a temperature above the melting point of zinc to form an oxidized sponge comprising a zinc oxide shell on the surface of the oxidized sponge. The anode comprises a continuous network comprising metallic zinc; a continuous network of void space interpenetrating the zinc network; and metallic zinc bridges connecting metallic zinc particle cores. The electrolyte fills the void space.

Moreover, US20170025677A1 provides a hyper-dendritic nanoporous Zinc foam useful in an electrode, which is preferably an anode. The zinc foam is a three-dimensional network of dendrites which is electrochemically active, electronically conductive, and at nanoscale. Thus, in certain preferred embodiments, the Zinc foam electrode is a nanoporous Zinc structure comprising both primary dendrites, and secondary dendrites. The hyper-dendritic nanoporous zinc foam exhibits a specific surface area of zinc foam which is preferably at least 2 times larger. This high relative surface to volume ratio of the zinc foam provides for a better and more uniform charge distribution, better charge capacity retention over multiple charge-discharge cycles, and longer effective lifespan in a rechargeable battery.

In addition, WO2019183083A1 provides a composition, comprising a nanoporous material, the nanoporous material comprising interconnected ligaments defining pores therebetween, the pores being open to the environment exterior to the nanoporous material, the nanoporous material optionally comprising a metal having a standard reduction potential less than the standard hydrogen electrode (SHE) at 0 V vs SHE, and the pores being characterized as having an average cross-section in the range of from about 3 to about 100 nm. It also provided a power cell comprising: the composition, the composition optionally being disposed in a removable cartridge; an amount of water, the power cell being configured to effect contact between the composition and the water; and a collector disposed to collect hydrogen evolved from contact between the water and the composition.

BRIEF SUMMARY OF THE INVENTION

There continues to be a need in the art for improved designs and techniques for a method of making a nanoporous Zn anode of an electrochemical cell to achieve a high areal capacity and a long cycle life.

According to an embodiment of the subject invention, a method of making a free-standing nanoporous Zn is provided. The method comprises compacting a predetermined amount of Zn compound precursor into a form of an anode; controlling a thickness of the Zn compound precursor to obtain desirable porosity; and reducing the Zn compound precursor in an electrochemical cell having an electrolyte at a predetermined volage against a reference electrode to obtain a nanoporous Zn anode. The Zn compound precursor is selected from zinc oxide, zinc carbonate, zinc chloride, zinc acetate, and any mixture of them. Further, the Zn compound precursor may comprise an additive selected from carbon black, carbon fiber, bismuth oxide, tin oxide, and calcium hydroxide. The compacting a predetermined amount of Zn compound precursor comprises compacting the predetermined amount of Zn compound precursor onto a conductive substrate. The conductive substrate is a Sn-plated Cu foam or a copper foam/foil. Moreover, the controlling a thickness of the Zn compound precursor comprises configuring a physical block that is a rigid perforated plate to control the thickness of the Zn compound precursor to obtain desirable porosity. The physical block is made of a material selected from polyproplene, high-density polyethylene, and acrylic resin. The electrolyte is an alkaline solution of potassium hydroxide, sodium hydroxide, or lithium hydroxide. The predetermined voltage is in a range between −1.55 V and −1.6 V.

In certain embodiments of the subject invention, an electrochemical cell is provided, comprising a nanoporous Zn anode coupled to a conductive substrate; a physical block; an electrolyte; a reference electrode; and a cathode electrode. The nanoporous Zn anode can be made according to the method of making a free-standing nanoporous Zn described above. The cell is a nickel-zinc cell, a silver-zinc cell, or a zinc-air cell. The cathode electrode is made of NiOOH. Moreover, the nanoporous Zn anode and the NiOOH cathode electrode are separated by a nonwoven cellulose membrane and a polymer separator. The electrolyte comprises KOH and LiOH. The electrolyte comprises KOH saturated with a Zn compound. The reference electrode is made of Ag/AgCl.

In some embodiments of the subject invention, a composition of a nanoporous Zn anode is made according to the method of making a free-standing nanoporous Zn described above. The composition of the nanoporous Zn anode comprises uniform and continuous ligaments; and pores of an average width in a range of about 200 nm to about 1000 nm.

DETAILED DISCLOSURE OF THE INVENTION

The embodiments of subject invention pertain to a method for electrochemically fabricating freestanding nanoporous zinc from a powder compact made of a zinc compound precursor.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
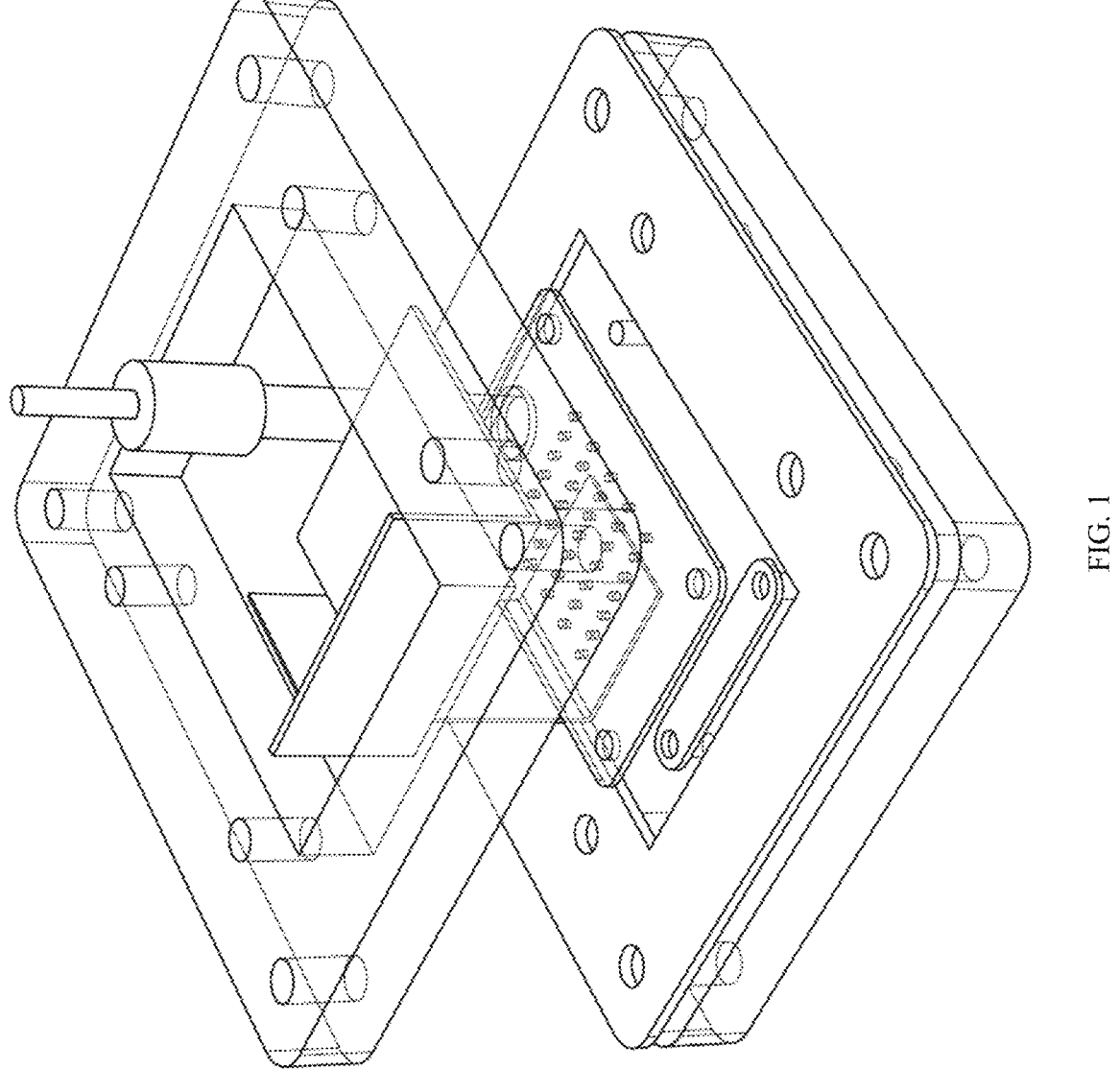
FIG. 1 is a schematic representation of the configuration of an electrochemical cell containing a Zn compound precursor, a physical block over it, a reference electrode, and a counter electrode, according to an embodiment of the subject invention.

According to embodiments of the subject invention, the method is implemented by applying a low voltage against a reference electrode to reduce a zinc compound precursor into nanoporous zinc which comprises uniform and continuous ligaments and pores of an average width in a range of about 200 nm to about 1000 nm. The as-formed nanoporous zinc can be directly utilized as an anode in a rechargeable alkaline battery, for example, a nickel-zinc battery, a silver-zinc battery, or a zinc-air battery, to achieve good rate performance and a long cycle life at great depths of discharge. FIG. 1 shows the electrochemical cell comprising an electrode of zinc compound compacted onto a conductive substrate, a physical block, an electrolyte, a reference electrode, and a counter electrode.

Following are examples that illustrate procedures for practicing the invention. These examples should not be construed as limiting. All percentages are by weight and all solvent mixture proportions are by volume unless otherwise noted.

Example 1—Method of Making Nanoporous Zinc

In the embodiment of the subject invention, nanoporous Zn is produced by the electrochemical reduction of a Zn compound precursor such as ZnO to Zn. First, a predetermined amount of ZnO powder as the precursor is directly compacted onto a conductive substrate, which may be a Sn-plated Cu foam or a copper foam/foil, using a hydraulic press. A physical block, which may be a rigid perforated plate made of a material such as polyproplene, high-density polyethylene or acrylic resin, is configured to control the final thickness of the nanoporous Zn and thereby the porosity of the nanoporous Zn. When the physical block is controlled to be further away from the top of the ZnO powder precursor, the final thickness of the nanoporous Zn is greater, and thereby the porosity of the nanoporous Zn is larger. Next, the ZnO powder precursor is reduced in an electrochemical cell of an electrolyte such as a solution of 3 M KOH at a volage in a range of, for example, −1.55--1.6 V vs a reference electrode made of a material of, for example, Ag/AgCl.

In one embodiment, the Zn compound precursor may be selected from zinc oxide, zinc carbonate, zinc chloride, zinc acetate, and any mixture of them.

In one embodiment, the Zn compound precursor may further comprise an additive selected from carbon black, carbon fiber, bismuth oxide, tin oxide, and calcium hydroxide.

In one embodiment, the electrolyte may be an alkaline solution of potassium hydroxide, sodium hydroxide, or lithium hydroxide.

Figure 2:
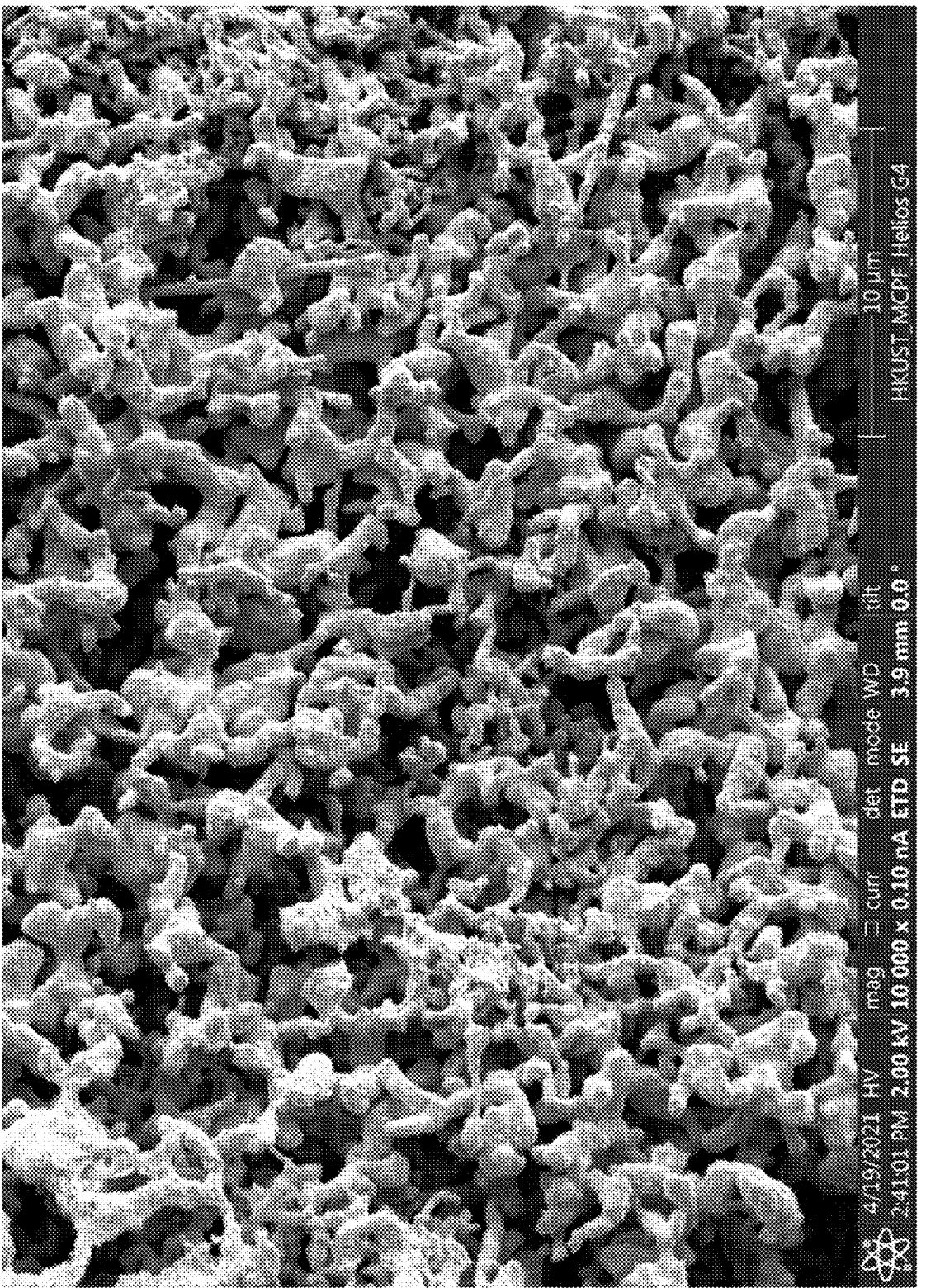
FIG. 2 shows an image of the morphology of nanoporous Zn indicating continuous ligament and pores, according to an embodiment of the subject invention.

When the reduction is complete, the nanoporous Zn obtained is cleaned with acetone and methanol to remove the electrolyte and then is vacuum dried. The as-produced nanoporous Zn can be directly used as the anode of a battery. FIG. 2 shows the morphology of the nanoporous Zn which is characterized by scanned electron microscopy (SEM).

Example 2—Nanoporous Zn as an Anode in a Ni—Zn Battery

The performance of the nanoporous Zn is evaluated in an alkaline Ni—Zn battery. The battery is assembled as a coin cell. The cell comprises the nanoporous Zn as the anode and a cathode made of a material such as NiOOH, separated by a nonwoven cellulose membrane and a polymer separator. The electrolyte comprises a solution of 6 M KOH mixed with a solution of 1 M LiOH or a solution of 9 M KOH saturated with ZnO. The battery is galvanostatically cycled at a charge/discharge rate of about 25 mA/cm$^2$ with a voltage cut-off range between about 1.35 V and about 1.9 V. The depth of discharge (DOD) is calculated based on the theoretical capacity of the anode based on its weight.

Figures 3, 4:
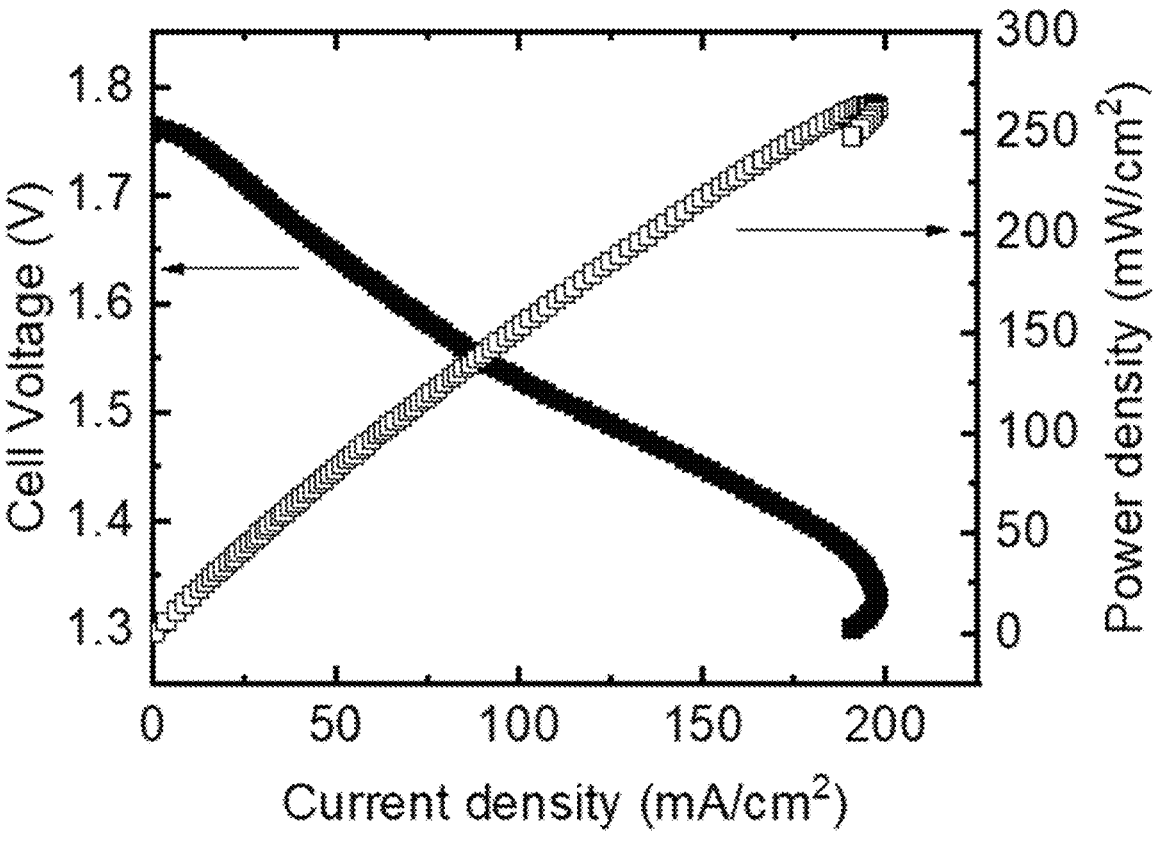
FIG. 3 shows a plot diagram of the polarization of the nanoporous Zn anode, according to an embodiment of the subject invention.
FIG. 4 shows a plot diagram of the cycle performance under 40% depth of discharge (DOD) of the nanoporous Zn anode at 25 mA/cm², according to an embodiment of the subject invention.
Figure 5:
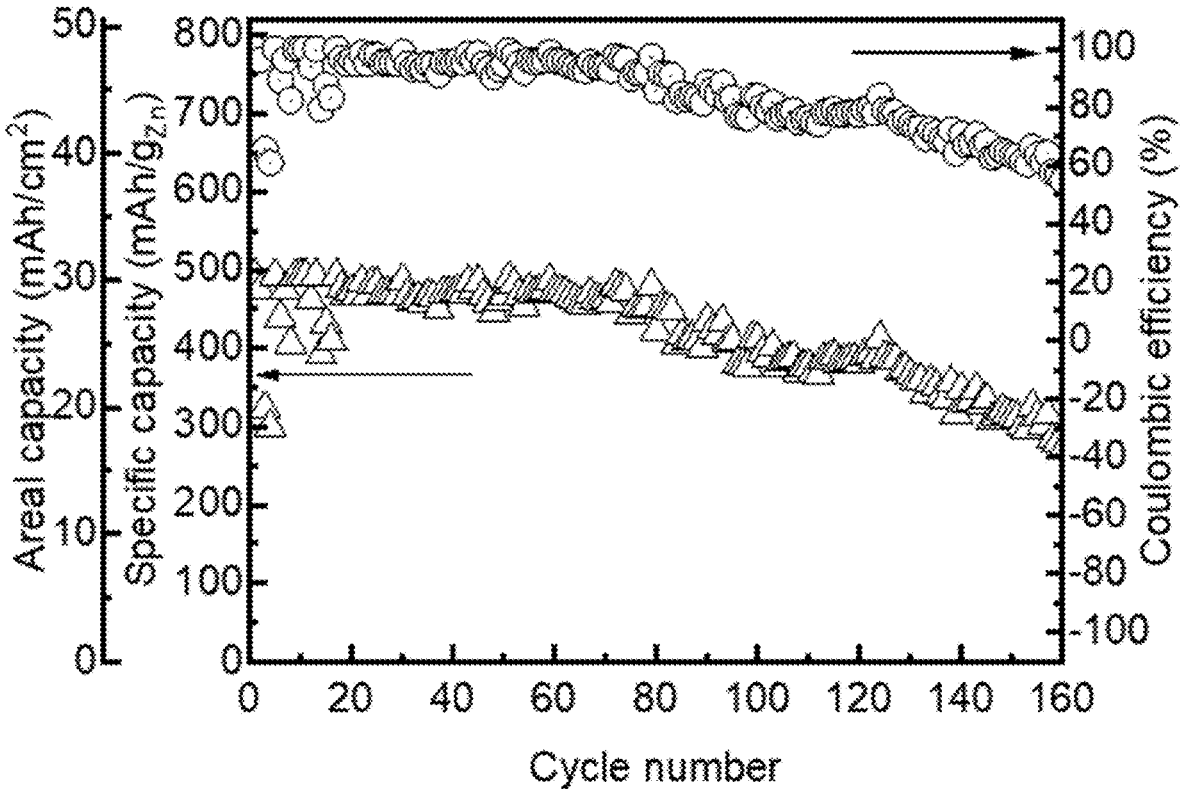
FIG. 5 shows a plot diagram of the cycle performance under 60% DOD of the nanoporous Zn anode at 25 mA/cm², according to an embodiment of the subject invention.

Referring to FIG. 3, in a polarization test, the battery with the nanoporous Zn anode delivers high current and power (for example, 264 mW/cm$^2$ at 196.4 mA/cm$^2$) owing to the high and stable electrical and ionic conductivities and the high specific area. At 40% DOD and 25 mA/cm$^2$, the anode retains a rechargeable areal capacity of about 20 mAh/cm$^2$ for 100 cycles with a coulombic efficiency near 100% and a specific capacity of about 328 mAh/g as shown in FIG. 4, owing to the continuous Zn phase that sustains a uniform distribution of reaction and the high specific area that requests the zincate ions into ZnO to inhibit shape changes. The battery retains a capacity greater than about 80% after about 200 cycles. At about 60% DOD, the battery is stable for about 100 cycles before the capacity decreases to about 70% of the initial value. FIG. 5 shows a plot diagram of the cycle performance under about 60% DOD of the nanoporous Zn anode at about 25 mA/cm$^2$.

In one embodiment, the cell may be a nickel-zinc cell.

In some embodiment, the cell may be a silver-zinc cell.

In certain embodiment, the cell may be a zinc-air cell.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A method of making a free-standing nanoporous Zn, comprising:
    compacting a predetermined amount of Zn compound precursor into a form of an anode;
    controlling a thickness of the Zn compound precursor to adjust porosity; and
    electrochemically reducing the Zn compound precursor to metallic zinc by applying a controlled reduction voltage against a reference electrode, thereby converting the Zn compound precursor to a free-standing nanoporous metallic Zn anode.

2. The method of claim 1, wherein the Zn compound precursor is selected from zinc oxide, zinc carbonate, zinc chloride, zinc acetate, and combinations of any of them.

3. The method of claim 2, wherein the Zn compound precursor further comprises an additive selected from carbon black, carbon fiber, bismuth oxide, tin oxide, and calcium hydroxide.

4. The method of claim 1, wherein the compacting a predetermined amount of Zn compound precursor comprises compacting the predetermined amount of Zn compound precursor onto a conductive substrate.

5. The method of claim 4, wherein the conductive substrate is a Sn-plated Cu foam or a copper foam/foil.

6. The method of claim 1, wherein the controlling a thickness of the Zn compound precursor comprises configuring a physical block that is a rigid perforated plate to control the thickness of the Zn compound precursor to adjust porosity.

7. The method of claim 6, wherein the physical block is made of a material selected from polyproplene, high-density polyethylene, and acrylic resin.

8. The method of claim 1, wherein the electrolyte is an alkaline solution of potassium hydroxide.

9. The method of claim 1, wherein the controlled reduction voltage is in a range between −1.55 V and −1.6 V.

10. The method of claim 1, wherein the electrolyte is an alkaline solution of sodium hydroxide or lithium hydroxide.

* * * * *